Sept. 1, 1931.   E. G. GLIDDEN   1,821,796
WINDING SPOOL BODY
Filed Nov. 14, 1929
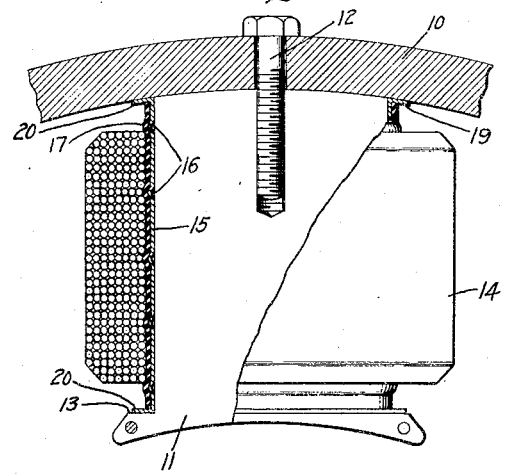
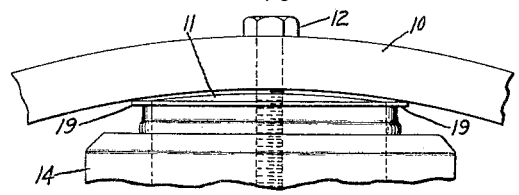
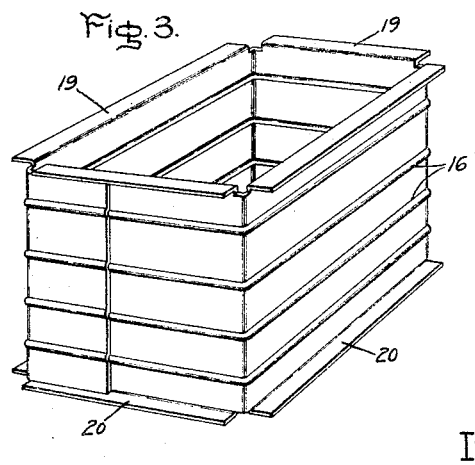
Inventor:
Everett G. Glidden,
by Charles E. Mullen
His Attorney.

Patented Sept. 1, 1931

1,821,796

UNITED STATES PATENT OFFICE

EVERETT G. GLIDDEN, OF SCHENECTADY, NEW YORK, ASSIGNOR TO GENERAL ELECTRIC COMPANY, A CORPORATION OF NEW YORK

WINDING SPOOL BODY

Application filed November 14, 1929. Serial No. 407,257.

My invention relates to winding spool bodies for electrical apparatus.

The coils of concentrated windings of electrical apparatus are wound on spool bodies, so that they can be made separate from the apparatus and conveniently arranged in place when the apparatus is assembled. In order to increase the path of surface leakage from the coil to the adjacent parts of the apparatus, it is frequently necessary to insulate the spool bodies and arrange the coils intermediate the ends of the spool. A winding constructed in this manner requires some arrangement for holding the coil in place on the spool body, and also requires a spring or other device for supporting the spool on the core structure to prevent wearing of the spool body and breaking down of the coil insulation, which would result from chafing between the spool and the core.

The object of my invention is to provide a simple spool body construction such that the coil and the spool will be securely retained in place on the core structure so as to prevent chafing and wear without the use of the usual coil clamps or springs and to support the coil on the spool intermediate the ends thereof in such a manner that the coil can be readily constructed. I accomplish this by providing a spool body having protuberances thereon for supporting the coil and a resilient flange at the end thereof for firmly retaining the spool on the core structure.

My invention will be more fully set forth in the following description referring to the accompanying drawings, and the features of novelty which characterize my invention will be pointed out with particularity in the claims annexed to and forming a part of this specification.

In the drawings Fig. 1 is a fragmentary view of the field structure of a dynamo electric machine embodying my invention, partly broken away to more clearly show the construction; Fig. 2 is a fragmentary view of the field structure shown in Fig. 1 in the course of assembly, and Fig. 3 is a perspective view of my improved spool body.

Referring to the drawings, I have shown my invention in connection with a dynamo electric machine having a frame 10 and a pole piece 11 which is bolted thereto as indicated at 12. The tips of the pole 11 are formed with shoulders 13. A coil 14 is formed on a spool body 15 which is retained in place between the shoulders 13 and the frame 10 of the machine, so that the coil 14 can be readily replaced by removing the pole 11 from the frame.

The coil 14 is formed on the spool body 15 separate from the machine and the spool body provides a rigid support for the coil, which is wound thereon intermediate the ends of the spool body. In order to retain the coil 14 in proper position intermediate the ends of the spool body in a simple and convenient manner, the spool body is, in accordance with my invention, provided with corrugations 16 extending about the same. In winding the coil 14 on the spool body a layer of insulation 17 such as treated fabric or other suitable material is first placed about the spool body, and the coil 14 is then wound thereon. In this construction the corrugations 16 serve to securely retain the coil 14 in place intermediate the ends of the spool body 15 without the necessity of binding tape or other supports which are usually employed for this purpose. The spool body is preferably formed of sheet metal bent into rectangular form and joined together at the ends thereof.

In order to securely retain the coil 14 and its spool body 15 in place between the shoulders 13 of the pole piece and the frame 10 of the machine without the use of the usual coil clamps or springs, I form spool body 15 at each end thereof with flanges 19 and 20 which reinforce the spool body. I preferably form the spool body of a single sheet of material having flanges along opposite edges thereof, shape the same as desired, and secure the adjacent ends of the sheet of material together to form the spool body as shown in Fig. 3 of the drawings. The flanges 20 fit directly against the shoulder 13 of the pole piece 11 and the flanges 19 are arranged so that when the spool body is arranged on the pole piece 11 the flanges extend directly outward from the edge of the pole 11 at the base thereof, as clearly shown in Fig. 2. By this construction when the coil 14 and the spool body 15 are placed on the pole piece 11 and the latter is bolted in the frame 10, flanges 19 are first brought against the frame 10 of the machine, as clearly shown in Fig. 2, and in this position of the parts the pole piece 11 is slightly spaced from the frame 10 of the machine. Upon further tightening of the pole 12, the pole piece 11 is drawn tightly against the frame 10 and the resilient flanges 19 are curved slightly to conform to the frame 10, as shown in Fig. 1. In this way the spool body 15 and the coil 14 are securely retained in the pole piece so as to prevent chafing between the spool body and the pole piece which would result in wearing of the spool body and the breaking down of the winding insulation, without the use of coil springs or clamps which are usually necessary in constructions of this kind.

Modifications of the particular form of my invention which I have described will occur to those skilled in the art so that I do not desire my invention to be limited to the particular arrangement set forth, and I intend in the appended claims to cover all modifications which do not depart from the spirit and scope of my invention.

What I claim as new and desire to secure by Letters Patent of the United States, is,—

1. A spool body consisting of a single sheet of material having protuberances thereon, and a coil supported on said protuberances, said body having a resilient flange spaced from said coil for firmly retaining the spool on a core structure.

2. A spool body consisting of a single sheet of material having transversely extending corrugations, a coil supported on said corrugations, and a resilient flange spaced from said coil at the end thereof for firmly retaining the spool body on a core structure.

3. A field structure for electrical apparatus including a core, a spool body arranged on said core, said spool body having protuberances thereon for supporting a coil and a resilient flange at the end thereof, a coil on said spool body intermediate the ends thereof and spaced from said flange, and means engaging the ends of said spool body and the resilient flange thereof for retaining the same on said core.

4. A dynamo electric machine having a frame including a pole piece, a spool body arranged on said pole piece, said spool body having protuberances thereon for supporting a coil and a resilient flange, a coil carried by said protuberances intermediate the ends of said spool body and spaced from said resilient flange, and means engaging the ends of said spool body and the resilient flange thereof for retaining the same on said pole piece.

5. A dynamo electric machine having a frame including a pole piece attached thereto, said pole piece having a shoulder at one end thereof, a spool body arranged on said pole piece between the pole thereon and said frame, said spool body having corrugations extending about the same for supporting a coil and resilient flanges at the ends thereof, said flanges being clamped between the shoulder on said pole piece and said frame, and a coil on said spool body intermediate the ends thereof and carried by said corrugations.

6. A dynamo electric machine having a frame including a pole piece, an insulated spool body arranged on said pole piece, said spool body having protuberances thereon for supporting a coil and a resilient flange, a coil carried by said protuberances intermediate the ends of said spool body and spaced from said resilient flange, and means engaging the resilient flange of said spool body for clamping said spool body and flange in place on said pole piece.

7. A dynamo electric machine having a frame including a pole piece attached thereto, said pole piece having a shoulder at one end thereof, an insulated spool body arranged on said pole piece between the pole thereon and said frame, said spool body having corrugations extending about the same for supporting a coil and resilient flanges at the ends thereof, said flanges being clamped between the shoulder on said pole piece and said frame, and a coil on said spool body intermediate the ends thereof and carried by said corrugations.

In witness whereof, I have hereunto set my hand this 13th day of November, 1929.

EVERETT G. GLIDDEN.